(12) United States Patent
Kato et al.

(10) Patent No.: US 9,080,615 B2
(45) Date of Patent: *Jul. 14, 2015

(54) TRANSMISSION DEVICE

(75) Inventors: Hiroshi Kato, Kariya (JP); Takuya Ishii, Hiratsuka (JP); Norihiro Tokunaga, Okazaki (JP); Satoru Kasuya, Nishio (JP); Kenta Tamabayashi, Sabae (JP)

(73) Assignee: AISIN AW CO., LTD., Anjo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 14/000,630

(22) PCT Filed: Mar. 15, 2012

(86) PCT No.: PCT/JP2012/057652
§ 371 (c)(1),
(2), (4) Date: Aug. 21, 2013

(87) PCT Pub. No.: WO2012/133253
PCT Pub. Date: Oct. 4, 2012

(65) Prior Publication Data
US 2013/0333997 A1 Dec. 19, 2013

(30) Foreign Application Priority Data

Mar. 30, 2011 (JP) ................................. 2011-075570
Nov. 2, 2011 (JP) ................................. 2011-241425

(51) Int. Cl.
*F16D 21/06* (2006.01)
*F16D 25/10* (2006.01)
(Continued)

(52) U.S. Cl.
CPC .............. *F16D 21/00* (2013.01); *F16D 13/683* (2013.01); *F16D 21/06* (2013.01); *F16D 25/0638* (2013.01); *F16D 25/10* (2013.01); *F16D 25/12* (2013.01); *F16D 2048/029* (2013.01)

(58) Field of Classification Search
CPC ................................................ F16D 2021/0661
USPC .................................................... 192/48.619
See application file for complete search history.

(56) References Cited

U.S. PATENT DOCUMENTS 6,305,521 B1 10/2001 Hall, III et al.
8,002,663 B2 8/2011 Nishida et al.
(Continued)

FOREIGN PATENT DOCUMENTS

CN 101960160 A 1/2011
DE 10 2007 022 419 A1 11/2008
(Continued)

OTHER PUBLICATIONS

May 22, 2012 International Search Report issued in International Application No. PCT/JP2012/056633.
(Continued)

*Primary Examiner* — Rodney H Bonck
(74) *Attorney, Agent, or Firm* — Oliff PLC

(57) ABSTRACT

A fastening portion is formed from a rivet hole of a first side wall portion of a clutch drum, a rivet hole of a second side wall portion of a clutch drum, and a rivet that is inserted into the rivet hole and the rivet hole to hold together the first side wall portion and the second side wall portion. The fastening portion is provided between a first engagement side oil chamber enclosed by the clutch drum and a clutch piston, and a second engagement side oil chamber enclosed by the clutch drum and a clutch piston.

7 Claims, 7 Drawing Sheets

(51) Int. Cl.
    *F16D 21/00*     (2006.01)
    *F16D 13/68*     (2006.01)
    *F16D 25/0638*     (2006.01)
    *F16D 25/12*     (2006.01)
    *F16D 48/02*     (2006.01)

(56) References Cited

U.S. PATENT DOCUMENTS

| | | | |
|---|---|---|---|
| 8,453,818 | B2 | 6/2013 | Kito et al. |
| 8,739,951 | B2 * | 6/2014 | Kasuya et al. ............ 192/48.619 |
| 2007/0102257 | A1 | 5/2007 | Aoki et al. |
| 2007/0227852 | A1 | 10/2007 | Uhler |
| 2008/0202884 | A1 * | 8/2008 | Nishida et al. ............. 192/106 F |
| 2009/0011892 | A1 | 1/2009 | Nishida et al. |
| 2010/0044184 | A1 | 2/2010 | Kito et al. |

FOREIGN PATENT DOCUMENTS

| | | |
|---|---|---|
| JP | 2007-107558 A * | 4/2007 |
| JP | A-2007-107559 | 4/2007 |
| JP | A-2008-232417 | 10/2008 |
| JP | A-2010-048381 | 3/2010 |
| JP | A-2010-48381 | 3/2010 |

OTHER PUBLICATIONS

May 22, 2012 Written Opinion issued in International Application No. PCT/JP2012/056633.
International Search Report issued in International Patent Application No. PCT/JP2012/057652 dated Aug. 20, 2012.
Oct. 17, 2013 Office Action issued in U.S. Appl. No. 13/430,078.
U.S. Appl. No. 13/430,078 in the name of Kasuya et al., filed Mar. 26, 2012.

* cited by examiner

F I G . 4
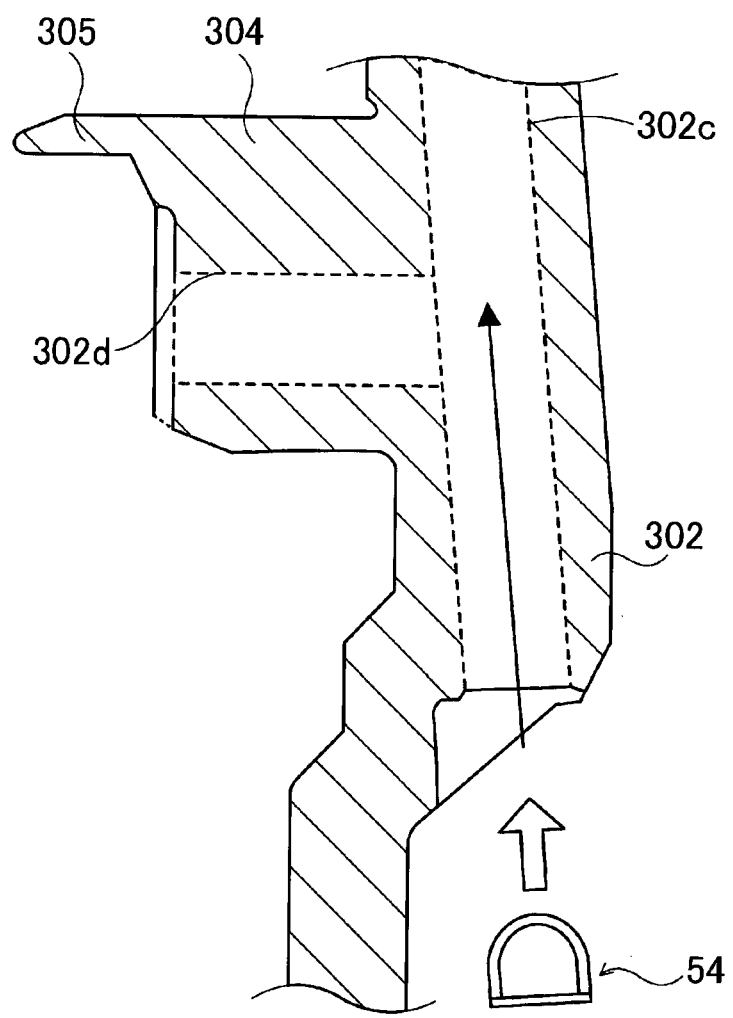

TRANSMISSION DEVICE

INCORPORATION BY REFERENCE

The disclosure of Japanese Patent Application Nos. 2011-075570 and 2011-241425 filed on Mar. 30, 2011 and Nov. 2, 2011, respectively, including the specifications, drawings and abstracts are incorporated herein by reference in their entirety.

BACKGROUND OF THE INVENTION

The present invention relates to a transmission device that includes a first clutch, and a second clutch disposed circumferentially inward of the first clutch.

DESCRIPTION OF THE RELATED ART

A proposed example of this type of transmission device in the past includes a first clutch and a second clutch. The first clutch includes a first clutch drum that holds a plurality of clutch plates; a first clutch piston that is in spline engagement with an inner circumferential surface of the first clutch drum, and moves in the axial direction to press the clutch plates; and a first cancel plate that defines together with the first clutch piston a cancel oil chamber for canceling centrifugal hydraulic pressure. The second clutch includes a second clutch drum that holds a plurality of clutch plates; a second clutch piston that is in spline engagement with an inner circumferential surface of the second clutch drum, and moves in the axial direction to press the clutch plates; and a second cancel plate that together with the second clutch piston defines a cancel oil chamber for canceling centrifugal hydraulic pressure, wherein the second clutch is disposed circumferentially inward of the first clutch so as to overlap with the first clutch as viewed from the radial direction (e.g., see Japanese Patent Application Publication No. 2010-48381 (JP 2010-48381 A)). The second clutch drum of the transmission device is formed from a cylinder portion that holds the clutch plates and axially supports the first cancel plate, and a drum portion that radially supports the cylinder portion, wherein the cylinder portion is secured to the drum portion by a snap ring.

SUMMARY OF THE INVENTION

However, if the cylinder portion of the second clutch drum is fixed by a snap ring to the drum portion as in the transmission device described above, the axial length of the drum portion must be increased in order to form a snap ring groove in the drum portion and ensure the strength of the drum portion in the area of the snap ring groove. This may increase the overall axial length of the second clutch, and interfere with efforts to achieve a more compact device.

A transmission device of the present invention achieves a more compact transmission device that includes a first clutch, and a second clutch disposed circumferentially inward of the first clutch.

The transmission device of the present invention employs the following to achieve the above.

A transmission device according to the present invention includes a first clutch that includes a first clutch drum and a first piston; and a second clutch that includes a second clutch drum and a second piston, and is disposed circumferentially inward of the first clutch. In the transmission device, the first clutch includes a first clutch oil chamber enclosed by the first clutch drum and the first piston, the second clutch includes a second clutch oil chamber enclosed by the first clutch drum and the second piston. In addition, a fastening portion, formed from a first through hole of a first side wall portion of the first clutch drum, a second through hole of a second side wall portion of the second clutch drum, and a rivet that is inserted into the first and second through holes and holds together the first and second side wall portions, is provided between the first clutch oil chamber and the second clutch oil chamber.

In the transmission device of the present invention, the fastening portion is formed from the first through hole of the first side wall portion of the first clutch drum, the second through hole of the second side wall portion of the second clutch drum, and the rivet that is inserted into the first and second through holes and holds together the first and second side wall portions. The fastening portion is provided between the first clutch oil chamber enclosed by the first clutch drum and the first piston, and the second clutch oil chamber enclosed by the first clutch drum and the second piston. By thus using the rivet to hold together the first side wall portion of the first clutch drum and the second side wall portion of the second clutch drum to fix the first clutch drum and the second clutch drum, there is no need to provide a snap ring and a section on a support member of the second clutch drum required for holding the snap ring, and the fastening portion can be provided between the first clutch oil chamber and the second clutch oil chamber. Therefore, an increase in the axial length can be suppressed to achieve a more compact device. In addition, torque is transmitted between the first and second clutch drums through the rivet. There is thus no need to form a spline for transmitting torque between the first and second clutch drums, and processing costs can be reduced as a consequence.

The first through hole of the first clutch drum may be formed with an inner diameter that becomes smaller from an outer side toward a second, clutch drum side of the first clutch drum. If the rivet is thus caulked from the outer side of the first clutch drum, the rivet can sufficiently fill the rivet hole and the rivet can be more strongly fixed to the first clutch drum.

The fastening portion that fastens the first clutch drum and the second clutch drum may be disposed circumferentially inward of the first clutch oil chamber and circumferentially outward of the second clutch oil chamber.

The first clutch may further include a first cancel plate, and the second clutch may further include a second cancel plate. In addition, at least a portion of the second clutch may overlap with the first clutch as viewed from a radial direction, and at least a portion of the fastening portion may be included within a range of a width, in an axial direction of the transmission device, of a space enclosed by the first clutch drum and the first cancel plate and a space enclosed by the first clutch drum and the second cancel plate. Thus, an increase in the axial length can be suppressed to achieve a more compact transmission device.

The second side wall portion of the second clutch drum may contact the first cancel plate, and the first cancel plate and the second side wall portion of the second clutch drum may be fastened to the first clutch drum. Thus, when the first cancel plate presses the second clutch drum due to centrifugal hydraulic pressure generated in the first clutch oil chamber of the first clutch, the fulcrum point (portion where the first clutch drum and the second clutch drum are fastened) and the force point (section where the second clutch drum supports the first cancel plate) of a torsional moment that acts on the second clutch drum correspond to substantially the same position. Therefore, a large torsional moment acting on the second clutch drum can be well suppressed.

A ring-shaped fixing portion may axially extend from the first side wall portion of the first clutch drum. In addition, an aligning portion may be formed axially extending from the fixing portion, and the first cancel plate and the second clutch drum may be fitted to the aligning portion of the fixing portion and fastened to the fixing portion. Thus, the first clutch drum, the first cancel plate, and the second clutch drum can be easily fastened together. In addition, by fitting the first cancel plate and the second clutch drum to the aligning portion axially extending from the fixing portion, the first cancel plate and the second clutch drum can be easily aligned.

The first piston of the first clutch may be axially movable by hydraulic pressure supplied to the first clutch oil chamber on an inner circumferential side of the first clutch drum, and define together with the first cancel plate a first cancel oil chamber that cancels centrifugal hydraulic pressure. The second piston of the second clutch may be axially movable by hydraulic pressure supplied to the second clutch oil chamber on an inner circumferential side of the second clutch drum, and define together with the second cancel plate a second cancel oil chamber that cancels centrifugal hydraulic pressure. The first clutch drum may include an inner cylinder portion that axially extends from an inner circumferential portion of the first side wall portion. The first piston may be supported axially slidable by the fixing portion of the first clutch drum, and define the first clutch oil chamber together with the first side wall portion and the fixing portion of the first clutch drum. The second clutch drum may axially support the first cancel plate. The second piston may be supported axially slidable by the inner cylinder portion of the first clutch drum and formed so as to slidingly contact an inner circumferential surface of the fixing portion of the first clutch drum, and define the second clutch oil chamber together with the inner cylinder portion, the first side wall portion, and the fixing portion of the first clutch drum. By thus utilizing the fixing portion extending from the first side wall portion of the first clutch drum, the first and second clutches can be easily configured.

BRIEF DESCRIPTION OF THE DRAWINGS

FIG. 4 is an enlarged sectional view that shows a second oil passage 302c formed in a first side wall portion 302 of the clutch drum 30 and a surrounding area;

DETAILED DESCRIPTION OF THE EMBODIMENT

Next, an embodiment of the present invention will be described.

Figure 1:
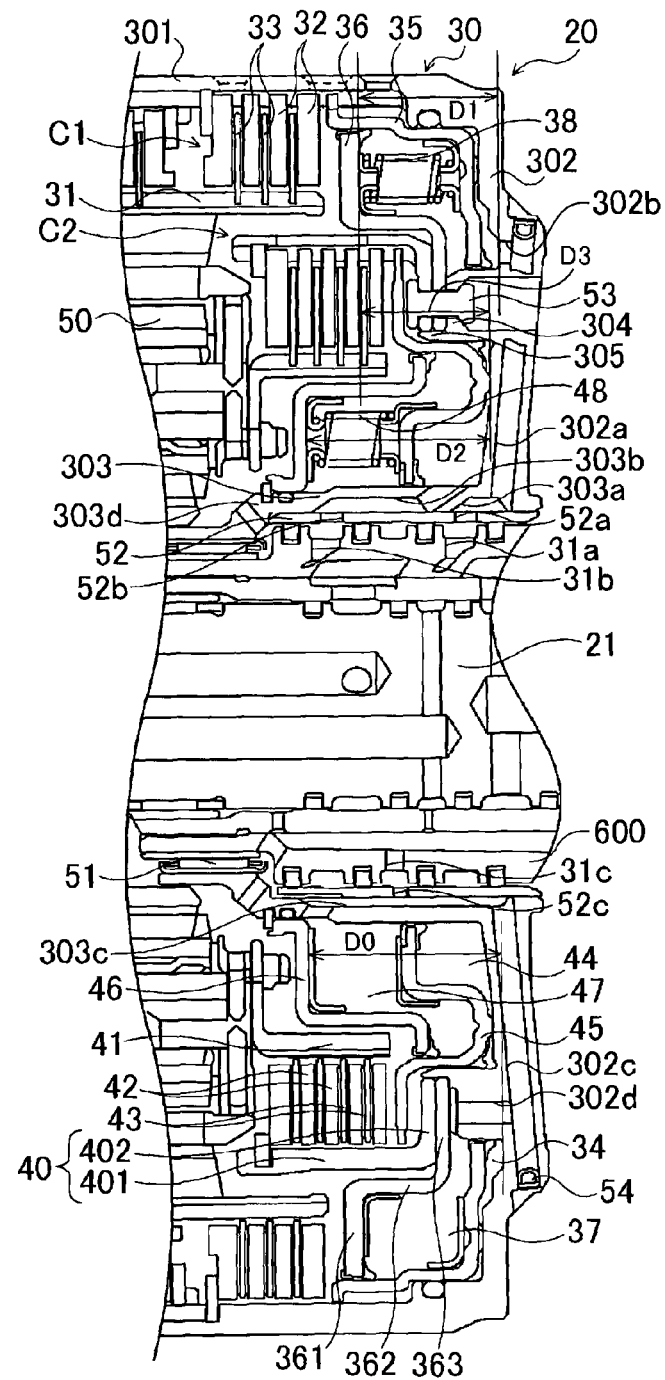
FIG. 1 is a sectional view that shows an essential portion of an automatic transmission 20 according to an embodiment of the present invention.

FIG. 1 is an enlarged sectional view that shows an essential portion of an automatic transmission 20 according to an embodiment of the present invention. The automatic transmission 20 according to the embodiment is configured as a stepped transmission and mounted in a vehicle. As shown in FIG. 1, the automatic transmission 20 includes an input shaft 21, as well as the clutches C1 and C2, a plurality of other clutches and brakes (not shown), and a planetary gear mechanism 50 for changing a power transmission path from the input shaft 21 to an output shaft (not shown). The clutches C1 and C2, the plurality of other clutches and brakes, and the planetary gear mechanism 50 are accommodated inside a transmission case (not shown). Note that the input shaft 21 of the automatic transmission 20 is connected to a crankshaft of an engine through a torque converter or the like, and the output shaft is connected to a drive wheel through a differential mechanism (differential gear) or the like (none of which are shown in the drawings).

The clutch C1 is configured as a multi-plate friction hydraulic clutch. The clutch C1 includes a clutch drum 30 that is supported rotatable around the input shaft 21 through a bearing 51; a clutch hub 31 that is fixed to a ring gear, for example, of the planetary gear mechanism 50; a plurality of ring-shaped clutch plates (mating plates) 32 that is slidably supported on an inner circumferential surface of the clutch drum 30 through a spline; a plurality of ring-shaped clutch plates (friction plates) 33 that is slidably supported on an outer circumferential surface of the clutch hub 31 through a spline; a clutch piston 35 that is fitted axially slidable on the inner circumferential surface of the clutch drum 30 and movable toward the clutch plates 32, 33, and defines together with the clutch drum 30 a first engagement side oil chamber (first clutch oil chamber) 34; a cancel plate 36 that defines together with the clutch piston 35 a first cancel oil chamber 37 for canceling centrifugal hydraulic pressure generated inside the first engagement side oil chamber 34; and a return spring 38 that is disposed between the clutch piston 35 and the cancel plate 36. The clutch drum 30 is configured from a first outer cylinder portion 301 that supports the clutch plates 32, a first side wall portion 302 that extends radially inward from an end of the first outer cylinder portion 301, and an inner cylinder portion 303 that axially extends from an inner circumferential portion of the first side wall portion 302. The inner cylinder portion 303 of the clutch drum 30 is press-fit (fitted) with a sleeve 52 so as to enable the sleeve 52 to rotate together with the inner cylinder portion 303. The sleeve 52 is rotatably supported by a fixed member (fixed shaft) 600 that is integrated with the transmission case, for example, and rotatably supports the input shaft 21. Thus, the clutch drum 30 is rotatable around the axis of the input shaft 21. One end surface (on the left side of the figure) of the sleeve 52 contacts an inner surface of a stepped portion 303d formed on the inner cylinder portion 303, whereby the sleeve 52 is positioned in the axial direction.

The clutch C2 is configured as a multi-plate friction hydraulic clutch, and disposed inward of the clutch C1 so as to overlap with the clutch C1 as viewed from the radial direction. The clutch C2 includes a clutch drum 40 that contacts (axially supports) a radially-extending inner circumferential portion of the cancel plate 36 biased by the return spring 38 toward the left side of the figure, and fastened to the clutch drum 30 together with the cancel plate 36; a clutch hub 41 that is fixed to a carrier, for example, of the planetary gear mechanism 50; a plurality of ring-shaped clutch plates (mating plates) 42 that is slidably supported on an inner circumferential surface of the clutch drum 40 through a spline; a plurality of ring-shaped clutch plates (friction plates) 43 that is slidably supported on an outer circumferential surface of the clutch hub 41 through a spline; a clutch piston 45 that is fitted axially slidable on the inner circumferential surface of the clutch drum 40 and movable toward the clutch plates 42, 43, and defines together with the clutch drum 30 a second engagement side oil chamber (second clutch oil chamber) 44; a cancel plate 46 that defines together with the clutch piston 45 a second cancel oil chamber 47 for canceling centrifugal hydraulic pressure generated inside the second engagement side oil chamber 44; and a return spring 48 that is disposed between the clutch piston 45 and the cancel plate 46. The clutch drum 40 is configured from a second outer cylinder portion 401 that supports the clutch plates 42, and a second side wall portion 402 that extends radially inward from an end of the second outer cylinder portion 401. Note that the cancel plate 36 of the clutch C1 may be supported in the axial direction by a member other than the clutch drum 40 of the clutch C2.

A ring-shaped fixing portion 304 extends axially inward from a substantially radial center portion of the first side wall portion 302 of the clutch drum 30 of the clutch C1. A ring-shaped aligning portion 305 also extends axially inward from an end portion on the inner circumferential side of the fixing portion 304. The cancel plate 36 of the clutch C1 includes an outer circumferential portion 361 that slidingly contacts an inner circumferential portion of the clutch piston 35 through a seal member; a coupling portion 362 that axially extends from the outer circumferential portion 361; and an inner circumferential portion 363 that extends radially inward from the coupling portion 362. One end surface of the inner circumferential portion 363 contacts an axially inward end surface of the fixing portion 304 of the clutch drum 30 and the other end surface of the inner circumferential portion 363 contacts the second side wall portion 402 of the clutch drum 40 of the clutch C2. In this state, the cancel plate 36 is fitted to an outer circumferential surface of the aligning portion 305, which extends from the fixing portion 304, together with the second side wall portion 402 of the clutch drum 40.

Figure 2:
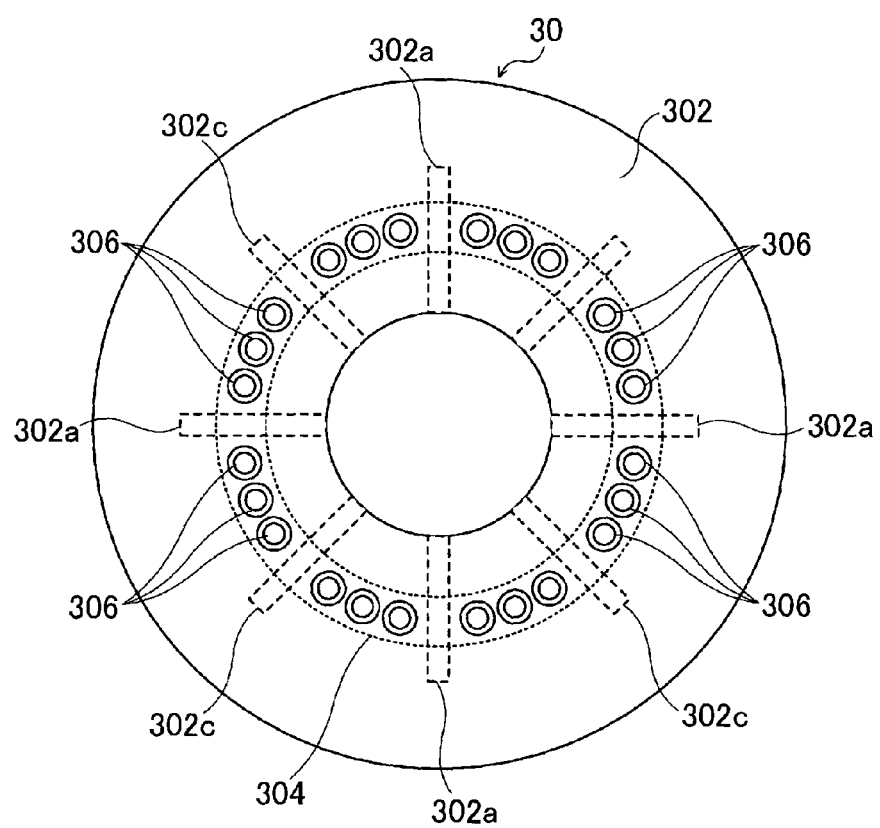
FIG. 2 is a frontal view of a clutch drum 30 as seen from the right side in FIG. 1.
Figure 3:
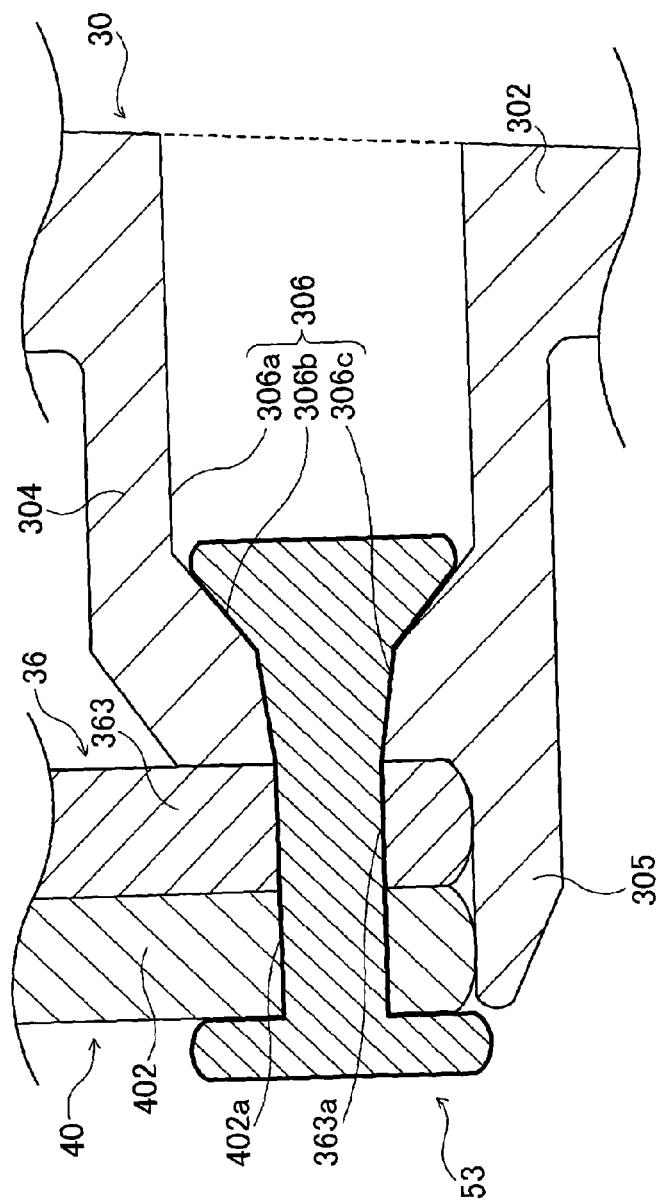
FIG. 3 is an enlarged sectional view that shows a fixing portion 304 of the clutch drum 30 and a surrounding area.

FIG. 2 is a frontal view of the clutch drum 30 as seen from the right side in FIG. 1. FIG. 3 is an enlarged sectional view that shows an essential portion of the fixing portion 304. As shown in the figures, the fixing portion 304 of the clutch drum 30 is formed with a plurality of rivet holes 306 that extends axially inward from an end surface of the first side wall portion 302 of the clutch drum 30. Each of the plurality of rivet holes 306 is formed of a first hole portion 306a that extends axially inward from the end surface of the first side wall portion 302, a second hole portion 306b that extends axially inward from the first hole portion 306a such that an inner diameter of the second hole portion 306b gradually decreases, and a third hole portion 306c that extends further axially inward from the second hole portion 306b such that an inner diameter of the third hole portion 306c gradually decreases. The cancel plate 36 of the clutch C1 is also formed with a plurality of rivet holes 363a, each of which is in communication with the third hole portion 306c of the rivet hole 306 of the fixing portion 304 when the inner circumferential portion 363 of the cancel plate 36 is fitted to the aligning portion 305. In addition, the second side wall portion 402 of the clutch drum 40 of the clutch C2 is formed with a plurality of rivet holes 402a, each of which is in communication with the rivet hole 363a of the cancel plate 36 when the inner circumferential portion of the second side wall portion 402 is fitted to the aligning portion 305. A rivet 53 is inserted in the rivet holes 306, 363a, and 402a. The rivet 53 is caulked from axially outward of the clutch drum 30 to fasten together the cancel plate 36 and the second side wall portion 402 of the clutch drum 40 to the fixing portion 304 of the clutch drum 30.

Thus, the clutch drum 30, the cancel plate 36, and the clutch drum 40 can be easily fastened together on the inner circumferential sides of the first engagement side oil chamber 34 and the first cancel oil chamber 37, and on the outer circumferential sides of the second engagement side oil chamber 44 and the second cancel oil chamber 47. In addition, the cancel plate 36 is axially supported by the second side wall portion 402 of the clutch drum 40 that contacts the inner circumferential portion 363. As shown in FIG. 1, the portion where the clutch drum 30, the cancel plate 36, and the clutch drum 40 are fastened (in the embodiment, a range from one end to the other end of the rivet 53) is included within a range of an axial width D0 of the first engagement side oil chamber 34 and the first cancel oil chamber 37 that are spaces (oil chambers) enclosed by the clutch drum 30 and the cancel plate 36, and the second engagement side oil chamber 44 and the second cancel oil chamber 47 that are spaces (oil chambers) enclosed by the clutch drum 30 and the cancel plate 46. Specifically, in the present embodiment, the portion where the clutch drum 30, the cancel plate 36, and the clutch drum 40 are fastened is included within a range of an axial width D1 of the first engagement side oil chamber 34 and the first cancel oil chamber 37 that are the oil chambers of the clutch C1, and included within a range of an axial width D2 of the second engagement side oil chamber 44 and the second cancel oil chamber 47 that are the oil chambers of the clutch C2. More specifically, the portion where the clutch drum 30, the cancel plate 36, and the clutch drum 40 are fastened is included within a range of a width D3 of a section where the first engagement side oil chamber 34 and the first cancel oil chamber 37, and the second engagement side oil chamber 44 and the second cancel oil chamber 47 overlap as viewed from the radial direction.

The clutch piston 35 of the clutch C1 is supported axially slidable by the fixing portion 304 of the clutch drum 30 through a seal member, and slidingly contacts an inner circumferential surface of the first outer cylindrical portion 301 of the clutch drum 30 through a seal member. The clutch piston 35 thus defines, together with the first outer cylinder portion 301, the first side wall portion 302, and the fixing portion 304 of the clutch drum 30, the first engagement side oil chamber 34. The clutch piston 45 of the clutch C2 is supported axially slidable by the inner cylinder portion 303 of the clutch drum 30 through a seal member, and slidingly contacts an inner circumferential surface of the fixing portion 304 of the clutch drum 30 through a seal member. The clutch piston 45 thus defines, together with the inner cylinder portion 303, the first side wall portion 302, and the fixing portion 304 of the clutch drum 30, the second engagement side oil chamber 44. By utilizing the fixing portion 304 formed on the first side wall portion 302 of the clutch drum 30 in this manner, the first and second clutches can be easily configured.

The fixed member 600 is formed with supply passages 31a, 31b that are connected to a hydraulic control device (not shown) through an oil passage (not shown) formed in the input shaft 21. The fixed member 600 is also formed with a supply passage 31c to which drained hydraulic oil is supplied from a hydraulic circuit of a lubrication system (not shown) that supplies lubricating oil to a lubrication target such as the planetary gear mechanism 50 mounted in the automatic transmission 20. In addition, the sleeve 52 press-fit to the clutch drum 30 of the clutch C1 is formed with an oil hole 52a that is in communication with the supply passage 31a formed in the fixed member 600, and an oil hole 52b that is in communication with the supply passage 31b. The inner cylinder portion 303 of the clutch drum 30 is formed with a relay oil passage 303a that is in communication with the oil hole 52a of the sleeve 52, and a relay oil passage 303b that is in communication with the oil hole 52b. The relay oil passage 303b is in communication with the second engagement side oil chamber 44. As shown in FIGS. 1 and 2, the first side wall portion 302 of the clutch drum 30 is formed with a plurality (four in the embodiment) of first oil passages 302a that radially extend in a radiating manner. Each of the plurality of first oil passages 302a on the inner circumferential side thereof is in communication with the relay oil passage 303a formed in the inner cylinder portion 303, and also in communication with the first engagement side oil chamber 34 through an oil passage 302b that is more circumferentially outward than the fixing portion 304 and axially extends through an inner portion of the first side wall portion 302. Thus, the hydraulic control device and the first engagement side oil chamber 34 are connected through the supply passage 31a of the fixed member 600, the relay oil passage 303a of the inner cylinder portion 303 of the clutch drum 30, and the first oil passage 302a and the oil passage 302b of the first side wall portion 302. Also, the hydraulic control device and the second engagement side oil chamber 44 are connected through the supply passage 31b of the fixed member 600, and the relay oil passage 303b of the inner cylinder portion 303 of clutch drum 30.

In addition, the sleeve 52 press-fit to the clutch drum 30 of the clutch C1 is formed with an oil hole 52c that is in communication with a supply passage 31c formed in the fixed member 600. The inner cylinder portion 303 of the clutch drum 30 is formed with a relay oil passage 303c that is in communication with the oil hole 52c of the sleeve 52. The relay oil passage 303c is formed so as to axially extend on an inner circumferential surface of the inner cylinder portion 303 of the clutch drum 30, and an end (an end portion on the left side of FIG. 1) of the relay oil passage 303c radially extends and is in communication with the second cancel oil chamber 47 of the clutch C2. As shown in FIGS. 1 and 2, the first side wall portion 302 of the clutch drum 30 is formed with a plurality (four in the embodiment) of second oil passages 302c that radially extend in a radiating manner that alternates with the plurality of first oil passages 302a so as not to overlap with the plurality of first oil passages 302a as viewed from the axial direction. Each of the plurality of second oil passages 302c on the inner circumferential side thereof is in communication with the relay oil passage 303c formed in the inner cylinder portion 303, and also in communication with the first cancel oil chamber 37 through an oil passage 302d that axially extends through an inner portion of the fixing portion 304. Thus, a draining oil passage of the hydraulic circuit of the lubrication system and the first cancel oil chamber 37 communicate through the supply passage 31c of the fixed member 600, the relay oil passage 303c of the inner cylinder portion 303 of the clutch drum 30, the second oil passage 302c of the first side wall portion 302, and the oil passage 302d. Also, the draining oil passage of the hydraulic circuit of the lubrication system and the second cancel oil chamber 47 communicate through the supply passage 31c of the fixed member 600, and the relay oil passage 303c of the inner cylinder portion 303 of clutch drum 30. By forming the first oil passages 302a and the second oil passages 302c on substantially the same plane inside the first side wall portion 302 in this manner, an increase in the axial length of the clutches C1, C2 can be suppressed. In addition, by alternately forming the first oil passages 302a and the second oil passages 302c as viewed from the axial direction, hydraulic oil can be equally supplied to the first engagement side oil chamber 34 and the first cancel oil chamber 37 found into ring shapes. Here, as shown by an arrow in FIG. 4, the first and second oil passages 302a, 302c described above can be easily formed by forming a hole portion penetrating radially inward from an outer periphery of the first side wall portion 302 of the clutch drum 30, and then press-fitting a plug (lid element) 54 to an opening portion of the hole portion positioned on the outer circumferential side of the first side wall portion 302 as shown by a white arrow in FIG. 4 to close the opening portion.

Figure 5:
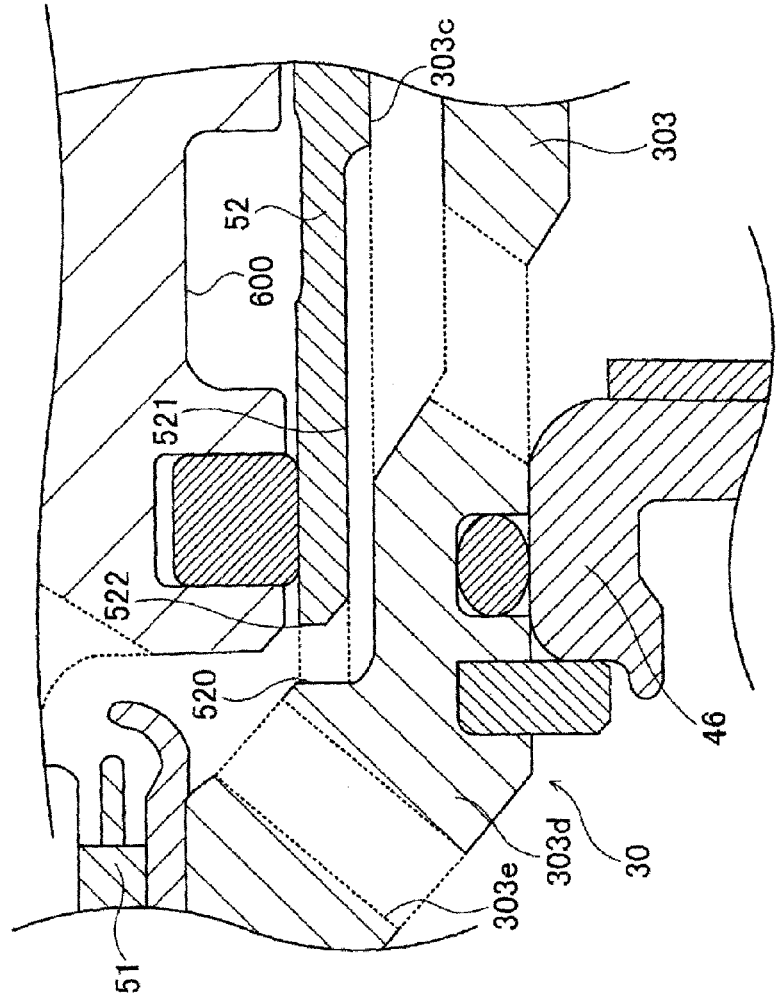
FIG. 5 is an enlarged sectional view that shows a portion of contact between a sleeve 52 and a stepped portion 303d of an inner cylinder portion 303 of the clutch drum 30.
Figure 6:
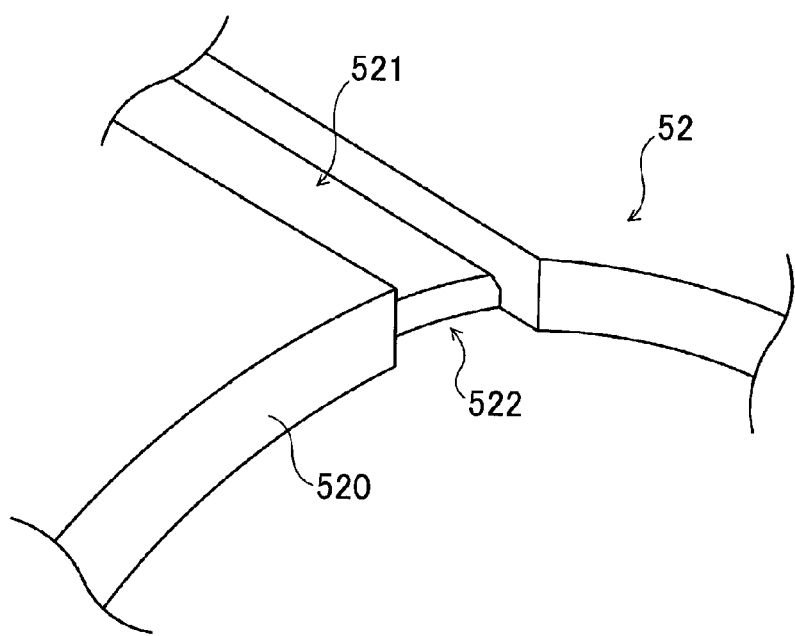
FIG. 6 is an enlarged view of an essential portion that shows an end portion of the sleeve 52.

FIG. 5 is an enlarged sectional view that shows a portion of contact between the sleeve 52 and the stepped portion 303d of the inner cylinder portion 303 of the clutch drum 30. FIG. 6 is an enlarged view of an essential portion that shows an end portion of the sleeve 52. As shown in the figures, at the end portion of the sleeve 52, a first passage 521 is formed at a plurality of locations (eight locations in the embodiment) on an outer periphery of the sleeve 52. Each first passage 521 is in communication with the relay oil passage 303c formed in the inner circumferential surface of the inner cylinder portion 303 of the clutch drum 30, and axially extends toward an end surface 520 that contacts the stepped portion 303d of the inner cylinder portion 303. In addition, at the end portion of the sleeve 52, a second passage 522 is formed at a plurality of locations (eight locations in the embodiment). Each second passage 522 is formed more axially recessed than the end surface 520 that contacts the stepped portion 303d of the inner cylinder portion 303, and radially extending to provide communication between the first passage 521 and an inner portion of the sleeve 52. The second passage 522 is formed so as to open widest at a position that is in communication with the first passage 521, and gradually narrow in the axial direction in the vicinity of a radial center portion of the sleeve 52 from the position at which the second passage 522 is in communication with the first passage 521, after which the second passage 522 has the same cross-sectional shape up to the inner circumferential surface of the sleeve 52. The stepped portion 303d of the inner cylinder portion 303 is formed with an oil passage 303e as shown in the figure.

Next, the operation to supply hydraulic oil to the oil chambers of the clutches C1, C2 of the automatic transmission 20 thus configured will be described. When engaging the clutch C1 of the embodiment, hydraulic oil from the hydraulic control device is supplied to the first engagement side oil chamber 34 through the supply passage 31a of the fixed member 600, the relay oil passage 303a of the inner cylinder portion 303 of the clutch drum 30, and the first oil passage 302a and the oil passage 302b of the first side wall portion 302. Thus, hydraulic pressure acting on the first engagement side oil chamber 34 causes the clutch piston 35 to move toward the clutch plates 32, 33 such that the clutch plates 32, 33 are sandwiched between the clutch piston 35 and a contact member fixed to the clutch drum 30, thus coupling the clutch drum 30 and the clutch hub 31 by the friction force acting between the clutch plates 32, 33. When disengaging the clutch C1, the hydraulic control device (not shown) stops the supply of hydraulic pressure to the first engagement side oil chamber 34, and the clutch piston 35 is biased by the return spring 38 to move toward the reverse side of the clutch plates 32, 33, thus disengaging the coupling of the clutch drum 30 and the clutch hub 31. When engaging the clutch C2, hydraulic oil from the hydraulic control device is supplied to the second engagement side oil chamber 44 through the supply passage 31b of the fixed member 600, and the relay oil passage 303b of the inner cylinder portion 303 of the clutch drum 30. Thus, hydraulic pressure acting on the second engagement side oil chamber 44 causes the clutch piston 45 to move toward the clutch plates 43, 44 such that the clutch plates 43, 44 are sandwiched between the clutch piston 45 and a contact member fixed to the clutch drum 40, thus coupling the clutch drum 40 and the clutch hub 41 by the friction force acting between the clutch plates 43, 44. When disengaging the clutch C2, the hydraulic control device (not shown) stops the supply of hydraulic pressure to the second engagement side oil chamber 44, and the clutch piston 45 is biased by the return spring 48 to move toward the reverse side of the clutch plates 43, 44, thus disengaging the coupling of the clutch drum 40 and the clutch hub 41.

If the automatic transmission 20 is operated with the first and second engagement side oil chambers 34, 44 filled with hydraulic oil as described above, centrifugal hydraulic pressure is generated in the first and second engagement side oil chambers 34, 44. Therefore, even if the supply of hydraulic pressure to the first and second engagement side oil chambers 34, 44 is stopped in order to disengage the clutches C1 and C2, the clutch pistons 35, 45 may remain pressed axially inward (toward the left side in FIG. 1) by the centrifugal hydraulic pressure, thus delaying disengagement of the clutches C1, C2. Therefore, when the automatic transmission 20 operates with the first and second engagement side oil chambers 34, 44 filled with hydraulic oil, the drained hydraulic oil from the hydraulic circuit of the lubrication system is supplied to the first cancel oil chamber 37 of the clutch C1 through the supply passage 31c of the fixed member 600, the relay oil passage 303c of the inner cylinder portion 303 of the clutch drum 30, and the second oil passage 302c of the first side wall portion 302, and the oil passage 302d. Also, the drained hydraulic oil from the hydraulic circuit of the lubrication system is supplied to the second cancel oil chamber 47 of the clutch C2 through the supply passage 31c of the fixed member 600, and the relay oil passage 303c of the inner cylinder portion 303 of clutch drum 30. As a consequence, centrifugal hydraulic pressure is also generated in the first and second cancel oil chambers 37, 47, and the centrifugal hydraulic pressure presses the clutch pistons 35, 45 axially outward (toward the right side in FIG. 1) so that a force caused by the centrifugal hydraulic pressure generated in the first and second engagement side oil chambers 34, 44 and acting on the clutch pistons 35, 45 can be canceled out.

In this case, immediately after the vehicle starts operating, the first and second cancel oil chambers 37, 47 are not fully filled with hydraulic oil and there is still air inside the first and second cancel oil chambers 37, 47. The air still inside the first cancel oil chamber 37 is discharged to outside the clutch C1 through the oil passage 302d, the second oil passage 302c of the first side wall portion 302, the relay oil passage 303c of the inner cylinder portion 303 of the clutch drum 30, and the first and second passages 521, 522 formed in the sleeve 52 when hydraulic oil is supplied to inside the first cancel oil chamber 37. The air still inside the second cancel oil chamber 47 is discharged to outside the clutch C2 through the oil passage 302d, the second oil passage 302c of the first side wall portion 302, the relay oil passage 303c of the inner cylinder portion 303 of the clutch drum 30, and the first and second passages 521, 522 formed in the sleeve 52. At such time, hydraulic oil having a high specific gravity moves by centrifugal force circumferentially outward inside the first and second cancel oil chambers 37, 47, which causes air inside the first and second cancel oil chambers 37, 47 to move circumferentially inward. Therefore, by using the second passage 522 that extends radially inward along the end surface 520 of the sleeve 52 as part of a path for discharging air, the air inside the first and second cancel oil chambers 37, 47 can be quickly discharged to outside while also suppressing an outflow of hydraulic oil through the second passage 522. In addition, the second passage 522 that provides communication between the first passage 521 and the inner portion of the sleeve 52 extends from the outer circumferential surface to the inner circumferential surface of the sleeve 52. Therefore, the zero-origin of the centrifugal hydraulic pressure in the first and second cancel oil chambers 37, 47 can correspond to the inner circumferential surface of the sleeve 52. As a consequence, it is possible to suppress the outflow of hydraulic oil while promoting the discharge of air when filling the first and second cancel oil chambers 37, 47 with hydraulic oil, and more suitably secure centrifugal hydraulic pressure in the first and second cancel oil chambers 37, 47. Note that the air discharged to outside the clutches C1, C2 through the first and second passages 521, 522 of the sleeve 52 is discharged through an inner portion of the transmission case to outside the vehicle. Once the hydraulic oil inside the first and second cancel oil chambers 37, 47 is discharged through the first and second passages 521, 522 of the sleeve 52, the hydraulic oil flows back to an oil pan (not shown) after being supplied to the lubrication target, i.e., the planetary gear mechanism 50, through the oil passage 303e formed in the stepped portion 303d of the inner cylinder portion 303 of the clutch drum 30, and a gap of the bearing 51.

Thus, when the automatic transmission 20 is operated with the first cancel oil chamber 37 filled with hydraulic oil and centrifugal hydraulic pressure is generated in the first cancel oil chamber 37, the centrifugal hydraulic pressure causes the inner circumferential portion 363 of the cancel plate 36 to press the second side wall portion 402 of the clutch drum 40 of the clutch C2 in the axial direction. Here, as described above, the inner circumferential portion 363 of the cancel plate 36 and the second side wall portion 402 of the clutch drum 40 are fastened by the fixing portion 304 of the clutch drum 30. Therefore, when the cancel plate 36 presses the clutch drum 40, the fulcrum point (portion where the clutch drum 40 and the clutch drum 30 are fastened) and the force point (section where the clutch drum 40 supports the cancel plate 36, i.e., portion of contact between the inner circumferential portion 363 of the cancel plate 36 and the second side wall portion 402 of the clutch drum 40) of a torsional moment that acts on the clutch drum 40 correspond to substantially the same position. Thus, a large torsional moment acting on the clutch drum 40 can be suppressed, and deformation of the clutch drum 40 can be well suppressed.

In the automatic transmission 20 of the embodiment described above, a fastening portion is formed from the rivet hole (first through hole) 306 of the first side wall portion 302 of the clutch drum 30, the rivet hole (second through hole) 402a of the second side wall portion 402 of the clutch drum 40, and the rivet 53 that is inserted into the rivet hole 306 and the rivet hole 402a to hold together the first side wall portion 302 and the second side wall portion 402a. The fastening portion is provided between the first engagement side oil chamber (first clutch oil chamber) 34 enclosed by the clutch drum (first clutch drum) 30 and the clutch piston (first piston) 35, and the second engagement side oil chamber (second clutch oil chamber) 44 enclosed by the clutch drum 30 and the clutch piston (second piston) 45. By thus using the rivets 53 to hold together the first side wall portion 302 of the clutch drum 30 and the second side wall portion 402 of the clutch drum 40 to fix the clutch drum 30 and the clutch drum 40, there is no need to provide a snap ring and a section on a support member of the clutch drum 40 (in the embodiment, the clutch drum 30) required for holding the snap ring, and the fastening portion can be provided between the first engagement side oil chamber 34 and the second engagement side oil chamber 44. Therefore, an increase in the axial length can be suppressed to achieve a more compact device. In addition, torque is transmitted between the clutch drum 30 and the clutch drum 40 through the rivets 53. There is thus no need to form a spline for transmitting torque between the clutch drum 30 and the clutch drum 40, and processing costs can be reduced as a consequence. Note that the cross-sectional shapes of the rivet holes 306, 402a are not limited to circular shapes, and may be rectangular grooves or the like.

The rivet holes 306 that respectively include the second and third hole portions 306b, 306c of the first side wall portion 302 of the clutch drum 30 are each formed with an inner diameter that becomes smaller from the outer side toward the clutch drum 40 side of the clutch drum 30. By thus forming each of the rivet holes 306 of the first side wall portion 302 of the clutch drum 30 with an inner diameter that becomes smaller from the outer side toward the clutch drum 40 side of the clutch drum 30, if the rivets 53 are caulked from the outer side of the clutch drum 30, the rivets 53 can sufficiently fill the rivet holes 306 and the rivets 53 can be more strongly fixed to the clutch drum 30.

In addition, the clutch C1 includes the cancel plate 36, the clutch C2 includes the cancel plate 46, and at least a portion of the clutch C2 overlaps with the clutch C1 as viewed from the radial direction. As shown in FIG. 1, the portion where the clutch drum 30 and the clutch drum 40 (as well as the cancel plate 36) are fastened is included within the range of the axial width D0 of the first engagement side oil chamber 34 and the first cancel oil chamber 37 that are spaces (oil chambers) enclosed by the clutch drum 30 and the cancel plate 36, and the second engagement side oil chamber 44 and the second cancel oil chamber 47 that are spaces (oil chambers) enclosed by the clutch drum 30 and the cancel plate 46. Specifically, the portion where the clutch drum 30 and the clutch drum 40 (as well as the cancel plate 36) are fastened is included within the range of the axial width D1 of the first engagement side oil chamber 34 and the first cancel oil chamber 37 that are the oil chambers of the clutch C1, and within the range of the axial width D2 of the second engagement side oil chamber 44 and the second cancel oil chamber 47 that are the oil chambers of the clutch C2. Thus, an increase in the axial length can be suppressed to achieve a more compact automatic transmission 20.

Figure 7:
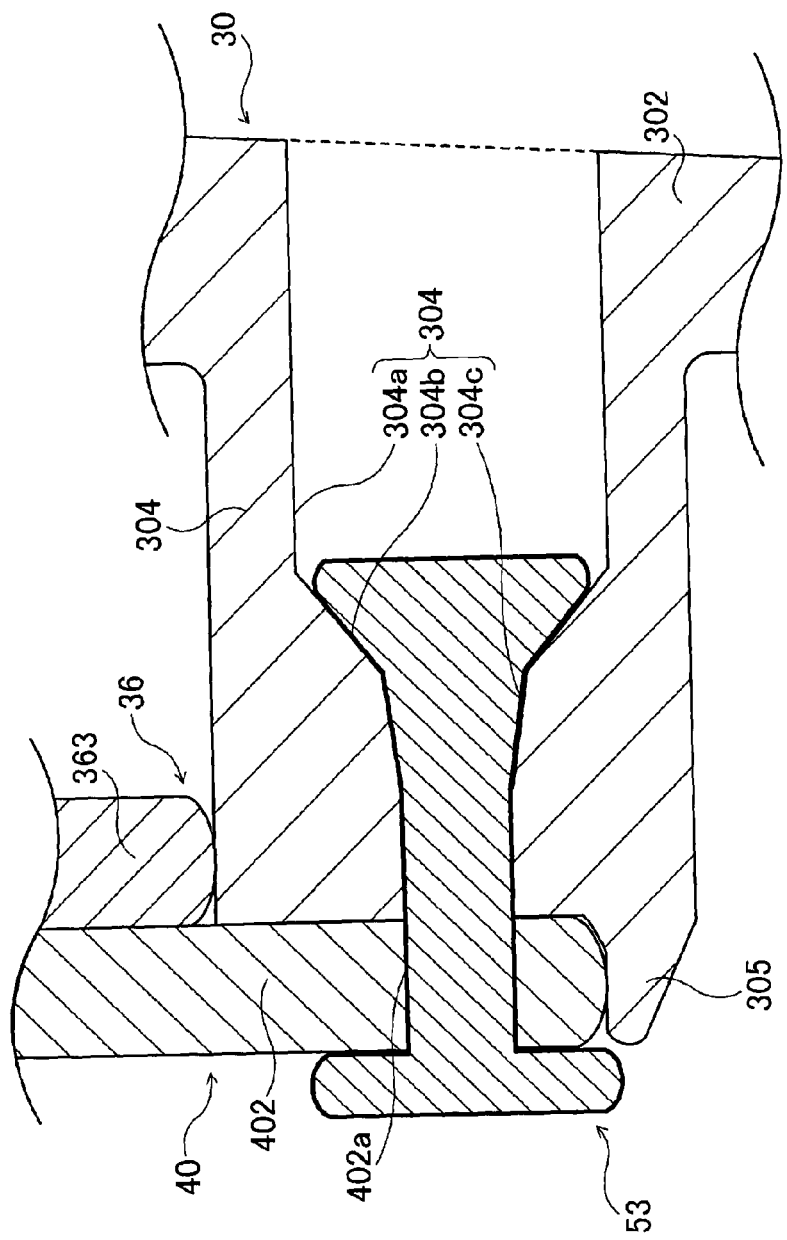
FIG. 7 is an enlarged sectional view that shows the fixing portion 304 of the clutch drum 30 and the surrounding area.

The second side wall portion 402 of the clutch drum 40 contacts the cancel plate 36, and the cancel plate 36 and the second side wall portion 402 of the clutch drum 40 are fastened to the clutch drum 30. Thus, deformation of the clutch drum 40 caused by a force from the cancel plate 36 due to the centrifugal hydraulic pressure generated in the first cancel oil chamber 37 of the clutch C1 can be suppressed. More specifically, when the cancel plate 36 presses the clutch drum 40 due to the centrifugal hydraulic pressure generated in the first cancel oil chamber 37, the fulcrum point (portion where the clutch drum 40 and the clutch drum 30 are fastened) and the force point (section where the clutch drum 40 supports the cancel plate 36, i.e., portion of contact between the inner circumferential portion 363 of the cancel plate 36 and the second side wall portion 402 of the clutch drum 40) of a torsional moment that acts on the clutch drum 40 correspond to substantially the same position. Therefore, a large torsional moment acting on the clutch drum 40 can be suppressed, and deformation of the clutch drum 40 can be well suppressed. Fixing the cancel plate 36 between both the clutch drum 30 and the clutch drum 40 eliminates the need for providing a seal structure for the cancel plate 36 to suppress the leakage of hydraulic oil from the first cancel oil chamber 37. However, as shown in FIG. 7, the cancel plate 36 may not be fastened to the fixing portion 304, provided that an end surface of the inner circumferential portion 363 on the left side of the figure is supported by the clutch drum 40 in the vicinity of the coupled portions of the clutch drum 30 and the clutch drum 40. By thus fastening the clutch drum 40 to the clutch drum 30 in the vicinity of the section where the clutch drum 40 supports the cancel plate 36, when the cancel plate 36 presses the clutch drum 40 due to the centrifugal hydraulic pressure generated in the first cancel oil chamber 37 of the clutch C1, the fulcrum point and the force point of a torsional moment that acts on the clutch drum 40 approach each other. Therefore, a large torsional moment acting on the clutch drum 40 can be suppressed, and deformation of the clutch drum 40 can be suppressed.

The ring-shaped fixing portion 304 extends from the first side wall portion 302 of the clutch drum 30. The aligning portion 305 is formed axially extending from the inner circumferential side of the fixing portion 304. The cancel plate 36 and the clutch drum 40 are fitted to the aligning portion of the fixing portion 304 and fastened to the fixing portion 304. Thus, the clutch drum 30, the cancel plate 36, and the clutch drum 40 can be easily fastened together. In addition, by fitting the cancel plate 36 and the clutch drum 40 to the aligning portion 305 axially extending from the fixing portion 304, the cancel plate 36 and the clutch drum 40 can be easily aligned.

Moreover, the clutch piston 35 of the clutch C1 can move in the axial direction by hydraulic pressure supplied to the first engagement side oil chamber 34 on the inner circumferential side of the clutch drum 30, and defines together with the first cancel plate 36 the first cancel oil chamber 37 for canceling centrifugal hydraulic pressure. The clutch piston 45 of the clutch C2 can move in the axial direction by hydraulic pressure supplied to the second engagement side oil chamber 44 on the inner circumferential side of the clutch drum 40, and defines together with the cancel plate 46 the second cancel oil chamber 47 for canceling centrifugal hydraulic pressure. The clutch drum 30 includes the inner cylinder portion 303 that axially extends from the inner circumferential portion of the first side wall portion 302. The clutch piston 35 is supported axially slidable by the fixing portion 304 of the clutch drum 30, and defines the first engagement side oil chamber 34 together with the first outer cylinder portion 301, the first side wall portion 302, and the fixing portion 304 of the clutch drum 30. The clutch piston 45 is supported axially slidable by the inner cylinder portion 303 of the clutch drum 30 and formed so as to slidingly contact the inner circumferential surface of the fixing portion 304 of the clutch drum 30, and defines the second engagement side oil chamber 44 together with the inner cylinder portion 303, the first side wall portion 302, and the fixing portion 304 of the clutch drum 30. By thus utilizing the fixing portion extending from the first side wall portion 302 of the clutch drum 30, the clutches C1 and C2 can be easily configured.

It should be noted that the present invention is not limited to the automatic transmission 20 of the embodiment, and may obviously be applied to a manual transmission as well.

Here, the correspondence between main elements of the embodiment and main elements of the invention as described in the Summary of the Invention will be explained. In the embodiment, the clutch C1 including the clutch drum 30 and the clutch piston 35 corresponds to a "first clutch"; the clutch C2 including at least the clutch drum 40 and the clutch piston 45, and disposed circumferentially inward of the clutch C1 to a "second clutch"; the first engagement side oil chamber 34 enclosed by the clutch drum 30 and the clutch piston 35 to a "first clutch oil chamber"; the second engagement side oil chamber 44 enclosed by the clutch drum 30 and the clutch piston 45 to a "second clutch oil chamber"; the rivet hole 306 of the first side wall portion 302 of the clutch drum 30 to a "first through hole"; the rivet hole 402a of the second side wall portion 402 of the clutch drum 40 to a "second through hole"; and the rivet 53 that is inserted into the rivet hole 306 and the rivet hole 402a, and holds together the first and second side wall portions 302, 402 to a "rivet".

Note that with regard to the correspondence between the main elements of the embodiment and the main elements of the invention as listed in the Summary of the Invention, the embodiment is only one specific example for carrying out the invention explained in the Summary of the Invention. This correspondence does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe an example for carrying out the present invention. However, the present invention is not particularly limited to such an example, and may obviously be carried out using various embodiments without departing from the scope of the present invention.

The present invention may be used in the manufacturing industry of a transmission device.

The invention claimed is:

1. A transmission device comprising:
   a first clutch that includes a first clutch drum and a first piston; and
   a second clutch that includes a second clutch drum and a second piston, and is disposed circumferentially inward of the first clutch, wherein
   the first clutch includes a first clutch oil chamber enclosed by the first clutch drum and the first piston,
   the second clutch includes a second clutch oil chamber enclosed by the first clutch drum and the second piston, and
   a fastening portion, formed from a first through hole of a first side wall portion of the first clutch drum, a second through hole of a second side wall portion of the second clutch drum, and a rivet that is inserted into the first and second through holes and holds together the first and second side wall portions, is disposed circumferentially inward of the first clutch oil chamber and circumferentially outward of the second clutch oil chamber.

2. The transmission device according to claim 1, wherein the first through hole of the first clutch drum is formed with an inner diameter that becomes smaller from an outer side toward a second clutch drum side of the first clutch drum.

3. The transmission device according to claim 1, wherein the first clutch further includes a first cancel plate, the second clutch further includes a second cancel plate, and
   at least a portion of the second clutch overlaps with the first clutch as viewed from a radial direction, and at least a portion of the fastening portion is included within a range of a width, in an axial direction of the transmission device, of a space enclosed by the first clutch drum and the first cancel plate and a space enclosed by the first clutch drum and the second cancel plate.

4. The transmission device according to claim 3, wherein the second side wall portion of the second clutch drum contacts the first cancel plate, and the first cancel plate and the second side wall portion of the second clutch drum are fastened to the first clutch drum.

5. The transmission device according to claim 3, wherein a ring-shaped fixing portion axially extends from the first side wall portion of the first clutch drum, and
   an aligning portion is formed axially extending from the fixing portion, and the first cancel plate and the second clutch drum are fitted to the aligning portion of the fixing portion and fastened to the fixing portion.

6. The transmission device according to claim 5, wherein the first piston of the first clutch is axially movable by hydraulic pressure supplied to the first clutch oil chamber on an inner circumferential side of the first clutch drum, and defines together with the first cancel plate a first cancel oil chamber that cancels centrifugal hydraulic pressure,
   the second piston of the second clutch is axially movable by hydraulic pressure supplied to the second clutch oil chamber on an inner circumferential side of the second clutch drum, and defines together with the second cancel plate a second cancel oil chamber that cancels centrifugal hydraulic pressure,
   the first clutch drum includes an inner cylinder portion that axially extends from an inner circumferential portion of the first side wall portion,
   the first piston is supported axially slidable by the fixing portion of the first clutch drum, and defines the first clutch oil chamber together with the first side wall portion and the fixing portion of the first clutch drum,
   the second clutch drum axially supports the first cancel plate, and
   the second piston is supported axially slidable by the inner cylinder portion of the first clutch drum and formed so as to slidingly contact an inner circumferential surface of the fixing portion of the first clutch drum, and defines the second clutch oil chamber together with the inner cylinder portion, the first side wall portion, and the fixing portion of the first clutch drum.

7. The transmission device according to claim 1, wherein a ring-shaped fixing portion axially extends from the first side wall portion of the first clutch drum and is disposed between circumferentially inward of the first clutch oil chamber and circumferentially outward of the second clutch oil chamber,
   the first piston is supported axially slidable by an outer circumferential surface of the ring-shaped portion through a first seal member, and
   the second piston is supported axially slidable by an inner circumferential surface of the ring-shaped portion through a second seal chamber.

* * * * *